United States Patent
Woltmann

[11] Patent Number: 5,246,571
[45] Date of Patent: Sep. 21, 1993

[54] CLOGGING INDICATOR FOR AN AQUARIUM FILTER

[75] Inventor: Klaus Woltmann, Demarest, N.J.
[73] Assignee: Willinger Bros., Inc., Oakland, N.J.
[21] Appl. No.: 918,669
[22] Filed: Jul. 22, 1992
[51] Int. Cl.⁵ .......................................... B01D 35/143
[52] U.S. Cl. ...................... 210/86; 116/267; 119/259; 210/87; 210/93; 210/169; 210/416.2
[58] Field of Search ................ 119/5; 210/86, 87, 94, 210/137, 169, 416.2, 95, 85, 90, 456, 483; 340/607; 116/227, 264

[56] References Cited

U.S. PATENT DOCUMENTS

| | | | |
|---|---|---|---|
| 1,001,929 | 8/1911 | Collins | 210/90 |
| 1,708,235 | 4/1929 | Nugent | 210/86 |
| 1,708,517 | 4/1929 | Nugent | 210/86 |
| 1,767,856 | 6/1930 | Nugent | 210/87 |
| 2,388,636 | 11/1945 | Harvuot | 210/95 |
| 3,549,015 | 12/1970 | Willinger | 210/416.2 |
| 3,746,169 | 7/1973 | Willinger et al. | 210/87 |
| 4,220,530 | 9/1980 | Gabriele | 210/86 |
| 4,285,813 | 8/1981 | Stewart et al. | 210/169 |
| 4,622,148 | 11/1986 | Willinger | 210/169 |
| 4,842,727 | 6/1989 | Willinger et al. | 210/169 |
| 5,098,585 | 3/1992 | Woltman et al. | 210/169 |

FOREIGN PATENT DOCUMENTS

977898 12/1964 United Kingdom ................. 210/90

Primary Examiner—Joseph W. Drodge
Attorney, Agent, or Firm—Helfgott & Karas

[57] ABSTRACT

A filter flow indicator for use with a filter bag into which contaminated aquarium water is pumped which comprises a meter tube connected to a inlet tube by an effective venturi connection. Water flowing in the inlet tube flows across the venturi connection. The rate of flow in the inlet tube is related to the amount of clogging in the filter bag. An indication is included on the meter tube as to when the filter should be replaced. As the filter bag clogs, the flow rate on the inlet tube slows down causing the water level in the meter tube to increase. When the level of the water reaches the indication, the filter is sufficiently clogged so that it should be replaced.

21 Claims, 4 Drawing Sheets

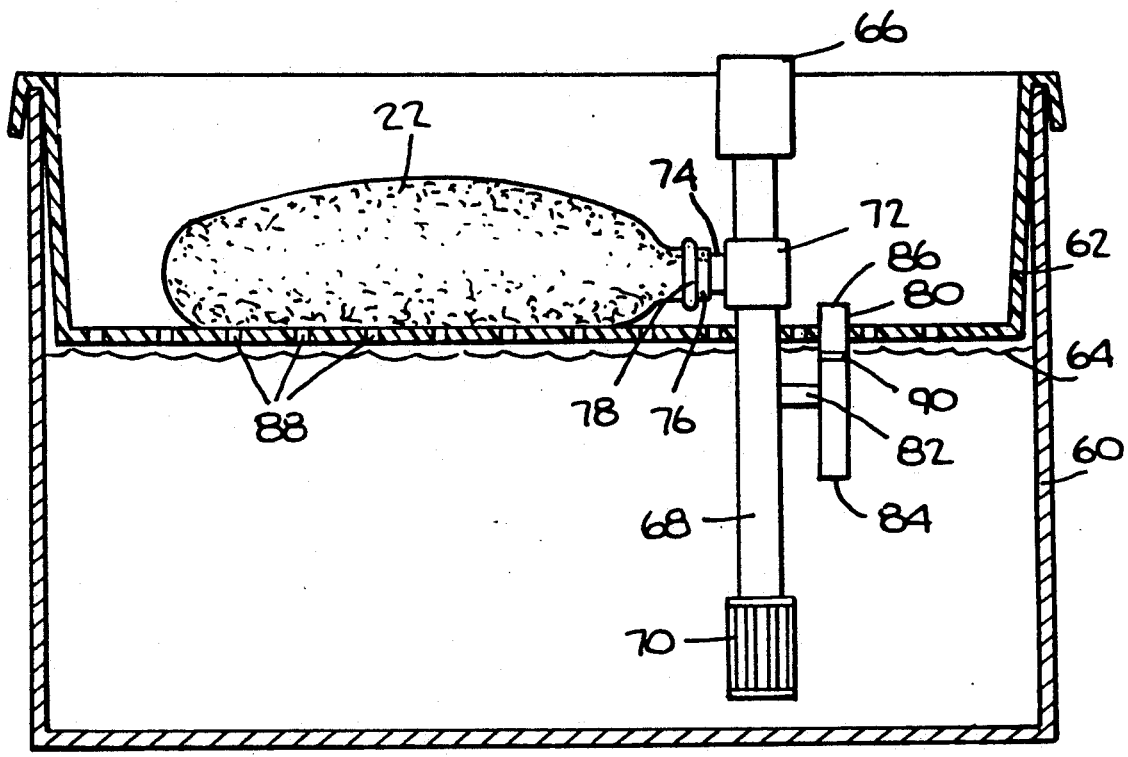
Fig.4.
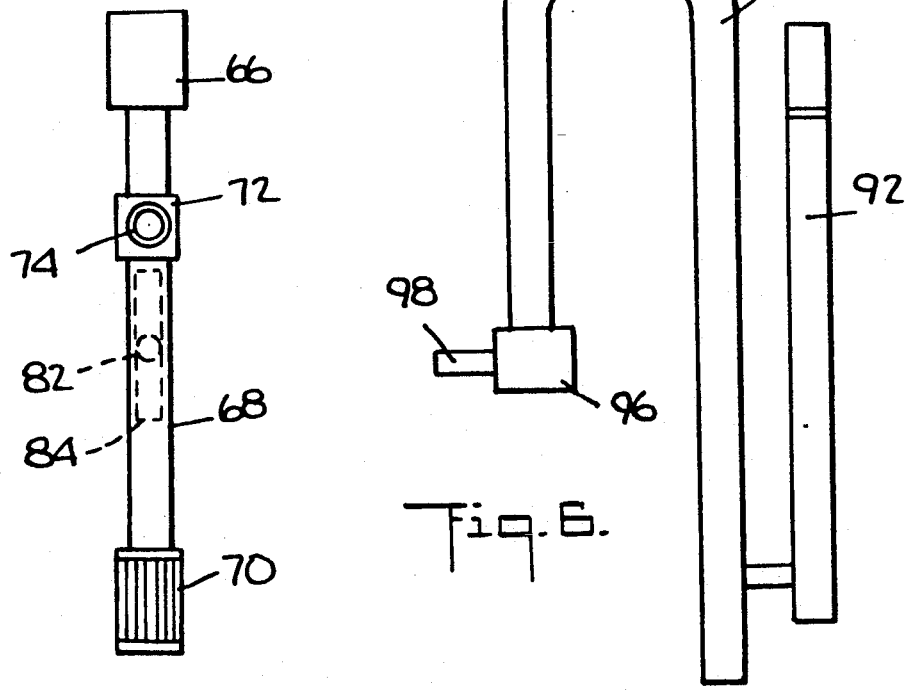
Fig.5.
Fig.6.

CLOGGING INDICATOR FOR AN AQUARIUM FILTER

BACKGROUND OF THE INVENTION

This invention relates to a filter flow indicator for an aquarium filter, and more particularly to a flow indicator for an aerobic aquarium filter which indicates when the filter bag needs replacement.

Whenever aquatic animals are to be maintained within an aquarium environment, the quality of the water in which they live must be maintained at a suitable level. In addition to properly controlling the temperature, the toxic material content of the water must be maintained at a sufficiently low level to prevent harm to the aquatic animals, which are primarily fish.

To combat the problem of toxic waste build-up, three types of filtration are used. The first is physical filtration wherein a water permeable membrane structure traps suspended waste material as contaminated water passes through the membrane. The second is chemical filtration which generally uses activated carbon and ion exchange resins to deactivate mostly organic waste. The third is biological filtration which is accomplished by means of living organisms such as bacteria which, among other thing, rid the aquarium of ammonia.

One example of a highly effective filter which provides physical, chemical and aerobic filtration is described in U.S. Pat. No. 4,622,148 assigned to the assignee of the present invention. The filter is in the form of an enclosed filter bag, pouch or receptacle into which a continuous supply of contaminated water flows.

The filter bag has walls which are made at least partially of a porous filter membrane. The bag is open at one end into which contaminated water is pumped. The contaminated water which flows into the bag exits through the porous walls of the bag. As the filter walls clog with contaminants, the flow of water through the walls will eventually slow down and stop.

The filter bag shown in the patent is constructed so that as the contaminants clog the filter walls, the fibrous material expands to permit the water flow to continue through the walls. The expanding action provides a longer lasting aerobic filter, but ultimately, the filter will clog and will substantially reduce any flow of water therethrough.

When using a filter bag in which the water passes transversely through the filter, when the filter clogs the water will flow over the filter indicating a clogged bag. However, with an aerobic filter as described wherein the water flows into the bag and then outward through the walls, it is not readily visible when the flow rate is reduced. If one neglects to change the bag at a predetermined time interval, the filtering action may have slowed to a point where the toxic contaminants are building up in the aquarium and will harm the fish.

A flow indicator for the filter bag which indicates when the bag should be replaced would be very beneficial. It would be particularly beneficial if it clearly indicates that a replacement is necessary before the flow through the bag completely stops so as to assure replacement before a build up of toxic chemicals in the aquarium.

SUMMARY OF THE INVENTION

Accordingly, it is an object of the present invention to provide a flow indicator for a filter bag.

A further object of the present invention is to provide a flow indicator for a filter bag into which water flows and exits from the walls of the bag.

A still further object of the present invention is to provide a flow indicator which indicates a slowing down of the contaminated water flow through a filter bag.

Another object of the present invention is to provide a flow indicator for a filter bag which clearly indicates when the filter bag should be replaced ahead of the time flow completely stops.

With these and other objects in view, the present invention contemplates a flow indicator which indicates the rate of flow of contaminated water through an inlet tube which carries water from an aquarium tank to a filter bag in a filter housing. The flow indicator consists of a meter tube which is closed at the bottom and open at the top. The meter tube is connected to the inlet tube near the bottom closed end of the meter tube by a connecting tube.

The meter tube will fill with aquarium water to the water level in the aquarium upon its insertion in the aquarium with the open end of the meter tube extending above the water level. Contaminated aquarium water being pumped up the adjacent inlet tube will flow past the connecting tube. The height of the water in the meter tube will vary dependent upon the flow rate of the water past the connecting tube. Specifically it will be inversely proportional to the rate of flow in the inlet tube. The height of the water in the meter tube will also be subject to the diameter of the inlet tube. The flow rate and tube size are selected so that the water level in the meter tube is always above the connection between the tubes to avoid air being pulled into the inlet tube.

When the flow rate in the inlet tube is at its maximum, the water level in the meter tube will be at its lowest. When the flow rate decreases, the level of the water in the meter tube will rise. Since the flow rate will decrease as the filter bag becomes clogged, the water level in the meter tube is an indication that the bag is clogging. A mark or line can be placed on the meter tube to indicate when the filter bag should be replaced, i.e. when the bag is sufficiently clogged to cause a slowing of the flow to a preselected flow rate.

BRIEF DESCRIPTION OF THE DRAWINGS

In the Drawings

FIG. 4 is a sectional view of an aquarium showing an alternate embodiment of the flow indicator being used with an enclosed filter bag;

FIG. 5 is a side view of the flow indicator shown in FIG. 4 looking from the left side; and FIG. 6 shows another alternate embodiment of the flow indicator.

DETAILED DESCRIPTION OF THE INVENTION

Figure 1:
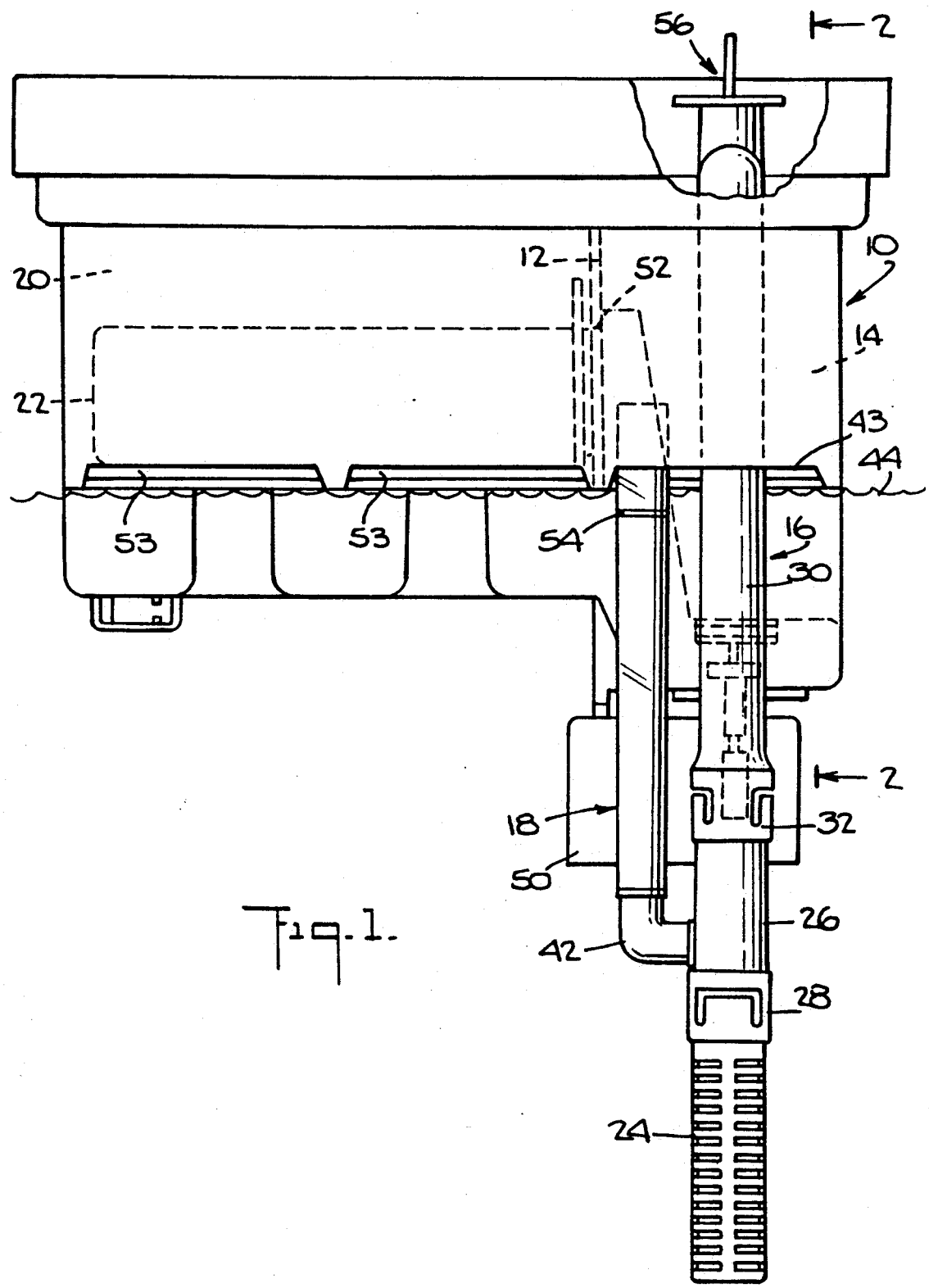
FIG. 1 is a view of an aquarium filter showing a flow indicator in accordance with the present invention and being used with an enclosed filter bag.
Figure 2:
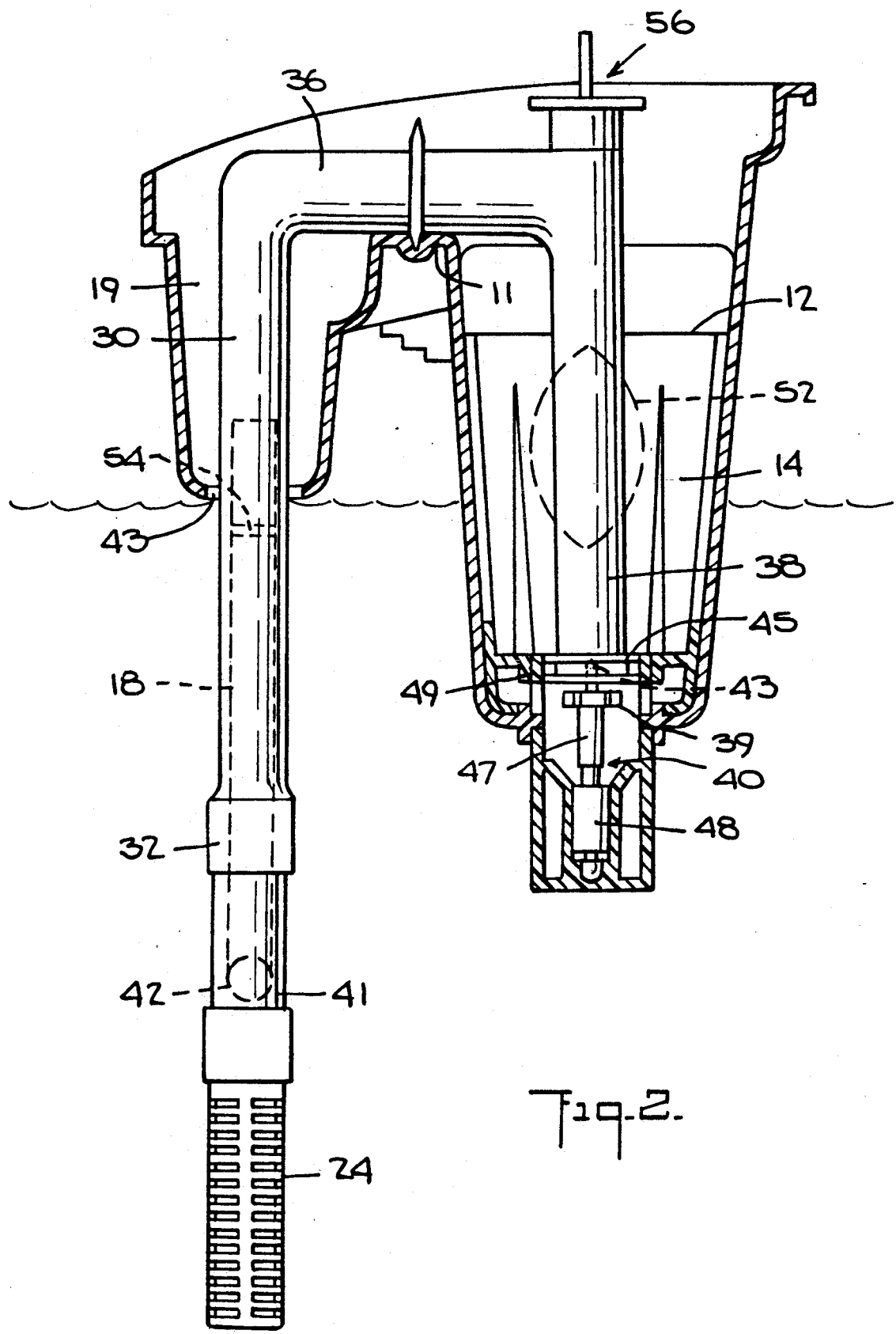
FIG. 2 is a sectional view of the aquarium filter shown in FIG. 1 taken along line 2—2, which shows a side view of the flow indicator.

Referring now to the drawings, in FIG. 1 there is generally shown an aquarium filter designated as 10. The filter 10 is provided with a ledge 11 (FIG. 2) which mounts the filter onto a wall of an aquarium tank (not shown). The filter 10 is substantially rectangular in shape and includes two compartments separated by a vertical wall 12 therebetween. One component 14 is referred to as the inlet compartment and the other as the filtering compartment 20. In front of the inlet compartment 14 is a receiving section 19 which receives the forward leg 30 of inlet tube 16 and the upper end of a meter tube 18. The inlet tube 16 is U-shaped and extends into the inlet compartment 14 which is directly behind the receiving section 19 (FIG. 2). The filtering compartment 20 retains a filter bag 22 into which the contaminated water flows. The filter bag 22 is of the type described in U.S. Pat. No. 4,622,148 issued to the assignee of the present invention.

The bag 22 is an enclosed bag, pouch or receptacle into which a continuous supply of contaminated aquarium water drawn from an aquarium tank is introduced under pressure. The walls of the filter bag 22 are permeable and are formed of randomly disposed fibrous or filamentary material of such density that solid waste material is trapped as water flows from the inside to the outside of the bag.

The filter bag described in the patent is constructed to permit the bag to expand under pressure to extend its useful life. In particular, as the bag clogs, the interior water pressure in the bag increases and the walls of the bag stretch or balloon thereby opening up the interstices in the wall to restore flow through the wall. The invention described herein works equally well with ordinary filter bags and variations such as the expandable filter bag described in the aforementioned patent.

The inlet tube 16 has a strainer 24 at its lower end. The strainer 24 is connected to a bridging tube 26 by a collar 28 which is forced over the lower end of the bridging tube 26. The bridging tube 26 is secured to a first leg 30 of the U-shaped inlet tube 16 by a collar 32 which is part of the bridging tube 26. The collar 32 is pressed onto the lower end of the leg 30. The leg 30 which is vertical turns at its upper end into a horizontal top portion 36 which turns into a second leg 38 which extends vertically downward. At the lower end of the second leg 38, an impeller mechanism 40 is rotatably held. A rotor 47 with a magnet 48 is supported at the end of the impeller 40 and is magnetically coupled to motor 50. For a complete description of the motor and its operation, see U.S. Pat. No. 4,512,885 assigned to the assignee of the present invention.

As shown in FIG. 1, an elbow connecting tube 42 connects meter tube 18 to inlet tube 16 via bridging tube 26. In order to use the meter tube, the inlet tube 16 and meter tube 15 are positioned into the filter 10 from the top. The inlet tube 16 and meter tube 18 depend through an opening 43 in the bottom of the receiving section 19 into the aquarium water which is at a level indicated by a wavy line 44. The top horizontal portion 36 of the inlet tube comes to rest on ledge 11 which separates the receiving section 19 from the inlet compartment 14. Upon insertion of the inlet tube 16 and meter tube 18 into the aquarium water, the water level in these tubes will correspond to the water level in the aquarium tank.

The filter is initially primed by placing water in the inlet compartment 14. When motor 50 is then energized, the impeller rotates and begins pumping and lifting water from the aquarium through the strainer 24 into bridging tube 26. The water flows from bridging tube 26 up leg 30 into horizontal portion 36 and down leg 38 where it exits and is directed into the bag 22.

Figure 3:
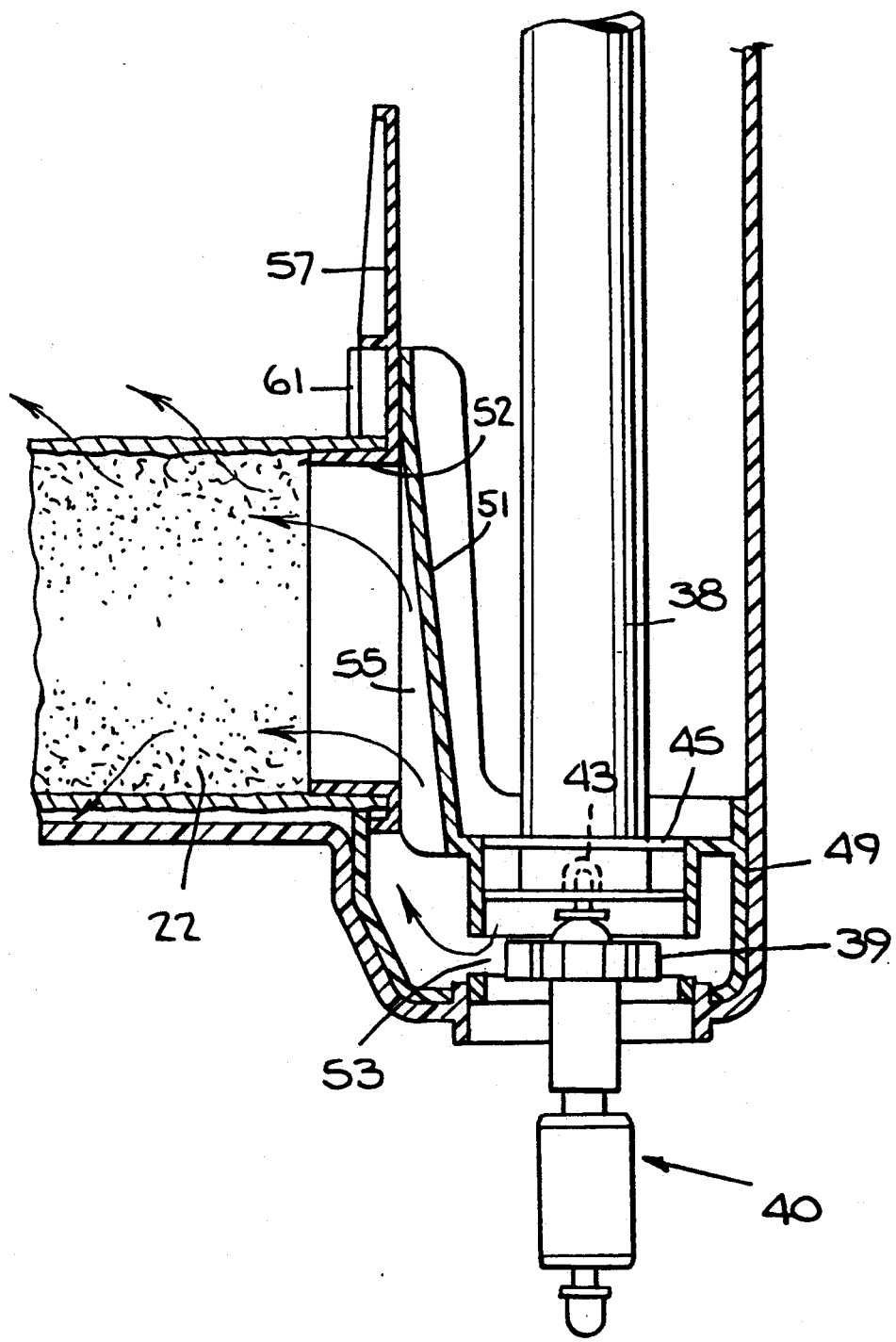
FIG. 3 is an enlarged fragmentary sectional front view of an aquarium filter which shows the flow of water into the filter bag.

As best seen by referring to FIGS. 2 and 3, the impeller 40 includes a rotating blade section 39. The upper edge 43 is seated within a circular head portion 45. The head 45 fits within a foot portion 49 of a directional flow controller shown generally at 51. The directional flow controller has a circular passageway 53 around the rotating member 39 and thereby substantially receives all of the contaminated water drawn up through inlet tube 16. This contaminated water, under pressure, flows upward through the channel 55. The filter bag 22 is supported by a front support plate 57 in which there is an aperture 52. The water flowing upward through the channel 55 enters into the filter bag 22 through the aperture 52. The front support member 57 is retained within the directional flow member 51 by means of the lip portion 61.

In this manner, substantially all of the contaminated water drawn into the aquarium filter passes directly into the filter bag. Accordingly, as the filter bag tends to clog, the water drawn in slows down and there would be no indication of the slowing down of the filtering action of the filter.

The filtered water passes through the walls of the filter bag 22 and flows into the filtering compartment 20. Therefrom, the filtered water runs back into the aquarium through the spillways 53 in the front of the aquarium filter.

As the water flows into and through the bridging tube 26, water will pass by the opening 41 in the elbow connecting tube 42 coupling to meter tube 18 causing a pressure reduction at the opening 41 of the elbow 42. This pressure reduction in conjunction with atmospheric pressure determines the height to which water will rise in the meter tube. As the flow rate increases, it reduces the pressure sensed at the opening 41 causing the water level in the meter tube 18 to drop as some of its water gets pulled out and into the flow path going up the inlet tube. Since the top of the meter tube 18 is open above the water level in the aquarium, no water is resupplied into the meter tube from its top. As the flow rate of aquarium water flowing up the inlet tube is reduced, the pressure at the opening 41 returns back to its previous value and water reenters from the inlet tube 16 into the meter tube 18 raising the level of the water in the meter tube to a higher point.

The diameter of the inlet tube is empirically adjusted for the anticipated flow rates to insure that at all times the water level in the meter tube will be within the range of the height of the meter tube throughout the variations of flow rates permitted. Specifically, empirically the height of the water level in the meter tube will be determined with the flow rate reduced to almost stoppage, and on the other hand normal flow rate will be measured, and the meter tube adjusted to accommodate the water level heights therein for both extremes.

As the filter bag 22 clogs, the rate of flow up the inlet tube 16 will slow and the water level in the meter tube will begin to rise. When the water level rises to a predetermined position which may be indicated by an indication such as a line 54 on the meter tube, a person will be alerted to the fact that the flow has slowed to a point where the bag is sufficiently clogged so that it should be replaced.

The inlet tube 16 is shown with an optional flow valve 56 which when turned will cause the rate of flow of water up the inlet tube from the aquarium to vary from slow to fast. Since the rate of flow will affect the height of the water in the meter tube, multiple markings can be provided on the meter tube to indicate when the filter bag should be replaced when using various flow rates. For example, there could be three lines one for slow, medium and fast flow rates.

Referring now to FIG. 4 and FIG. 5, an alternate embodiment of the flow indicator is shown. An aquarium 60 is shown in section. A trough 62, also shown in section, is supported across the top of the aquarium tank and is at least partly out of the aquarium water indicated by wavy line 64.

A water pump 66 is shown and includes an impeller (not shown) which lifts water through an inlet tube 68 at the bottom of which is a strainer 70. Other suitable water pumping arrangements may be employed for lifting water from the aquarium tank. The inlet tube 68 has coupler 72 from which extends an outlet 74. Filter bag 22 has an open end 76 which is placed over outlet 74 and is held tightly against the outlet by a collar 78 such as a rubber O-ring.

A meter tube 80 is connected to inlet tube 68 by a coupling tube 82. The meter tube 80 is closed at its lower end 84 and open at its upper end 86. When water pump 66 is energized, aquarium water flows up inlet tube 68 and out through outlet 74 into the filter bag. Water also flows along coupling tube 82 controlling the level in meter tube 80. Water will flow through the walls of the filter bag 22 into trough 62 and through holes 88 in the bottom of the trough back into aquarium tank 60.

As previously described, the height of the water in the meter tube 80 indicates the degree to which the filter bag is clogged. The diameter of the inlet tube and the porosity of the bag 22 can be selected so that the water rises in the meter tube to a preselected height when flow through the filter bag has slowed sufficiently to indicate a certain degree of clogging. A mark 90 is put on the tube at the selected level to indicate a replacement of the filter bag is necessary.

In FIG. 6 there is shown another embodiment of the meter tube. As compared to FIG. 1, a meter tube 92 is displaced 90 degrees from the location of meter tube 18. The meter tube 92 is connected to U-shaped inlet tube 94 and has an impeller pump 96 located adjacent outlet 98. In all other respects, the flow indicator works as described with respect to the other embodiments.

There has been described a preferred and alternate embodiments of the invention. However, it should be understood that various changes and modifications may be made thereto without departing from the spirit and scope of the invention.

What is claimed is:

1. A filter flow indicator in combination with an aquarium tank including means containing an aquarium filter medium for filtering aquarium water, an indicator comprising:

an inlet tube having an entry opening immersible in the aquarium water for accepting aquarium water, and an outlet opening for delivering water to the filter medium;

a meter tube running substantially parallel to the inlet tube; and a connection tube between the inlet tube and the meter tube across which water flowing through the inlet tube can transversely pass to control the water level in the meter tube, said meter tube including indication means thereon for indicating that the filter medium is clogged and should be replaced when said level reaches said indication means.

2. A filter flow indicator according to claim 1, wherein:

said filter medium is in the shape of a bag which has an opening which receives water discharged from said outlet opening of the inlet tube.

3. A filter flow indicator according to claim 1, wherein said meter tube has an open upper end, said tube being of sufficient height to have said upper, end extend above the level of water in the aquarium tank.

4. A filter flow indicator according to claim 1, wherein said meter tube has a closed lower end and wherein said connection tube couples to said meter tube between said upper and lower ends.

5. A filter flow indicator according to claim 3, wherein said connection tube couples to said meter tube at a lower end thereof.

6. A filter flow indicator according to claim 1, wherein the size of said inlet tube is such that the level of water in the meter tube varies within the meter tube as the flow rate of water flowing in the inlet tube varies.

7. A filter flow indicator according to claim 1, wherein said connection tube provides for an effective control on the height of the water in the meter tube.

8. A filter flow indicator according to claim 1, which further comprises:

a flow valve which can vary the rate of flow in the inlet tube;

said indication means on the meter tube being adapted to indicate a clogged filter condition at various rates of flow.

9. A filter flow indicator according to claim 1, and further comprising flow directional means for directing substantially all of the accepted aquarium water into the filter medium.

10. A filter flow indicator in combination with a filer bag which is open at one end to receive contaminated water from an aquarium tank which water is then filtered by the walls of the bag as the water passes through the walls on its way back to the aquarium tank, the indicator comprising:

an inlet tube partially immersible in the aquarium tank to receive the contaminated water from the aquarium tank and positioned in communication with the filter bag for transporting water from the aquarium tank into the filter bag;

a meter tube;

a coupling tube between the inlet tube and the meter tube, said meter tube extending upward from the coupling tube; and means for pumping contaminated water from the aquarium tank through the inlet tube into the filter bag, the tube arranged such that said water flowing in the inlet tube is transversely crossing said coupling tube with the height of the water level in the meter tube being greater when the flow rate is smaller in the inlet tube and the height of the water in the meter tube being lower when the flow rate in the inlet tube is greater, said flow rate being greater when the filter bag is less clogged and smaller when the filter bag is more clogged, said meter tube including indication means thereon for indicating when the filter bag is clogged and should be replaced upon the water level in said meter tube reaching said indication means.

11. A filter flow indicator according to claim 10, wherein:

the meter tube extends upward a sufficient distance so that the upper end of the meter tube will be above the level of the water in the aquarium tank when in use.

12. A filter flow indicator according to claim 11, wherein the upper end of the meter tube is open.

13. A filter flow indicator according to claim 11, wherein said meter tube has a closed lower end and wherein said coupling tube couples to said meter tube between said upper and lower ends.

14. A filter flow indicator according to claim 11, wherein said coupling tube couples to said meter tube at a lower end thereof.

15. A filter flow indicator according to claim 10, and further comprises flow directional for directing substantially all of the contaminated aquarium water from the inlet tube directly into the filter bag.

16. An aquarium filter comprising an inlet compartment arranged for receiving contaminated water from an aquarium tank and a filtering compartment for retaining a filter bag;

an inlet tube having one end thereof in communication with the contaminated water in the aquarium tank and the other and thereof in communication with said inlet compartment;

means for pumping contaminated water from the aquarium tank through the inlet tube wherein said water can then flow to said filtering compartment for filtration by said filter bag;

means for discharging the filtered water from the filtering compartment back into the aquarium tank;

a meter tube positioned adjacent to and substantially parallel to at least a portion of said inlet tube, a portion of said meter tube being insertable into water in the aquarium tank, and coupling tube means between said inlet tube and said meter tube, the tubes being arranged such that as the aquarium water passes through said inlet tube it traverses across an opening of said coupling tube means thereby controlling the height of the water level in said meter tube, said meter tube including indication means thereon for indicating that said filter bag is clogged and should be replaced when the height of the water level reaches said indication means.

17. An aquarium filter as in claim 16, wherein said coupling tube mans connects said inlet tube and said meter tube along portions thereof which are disposed below the water level of the aquarium tank water.

18. An aquarium filter as in claim 16, wherein the upper end of said meter tube extends upwardly above the aquarium water level.

19. An aquarium filter as in claim 18, wherein the upper end of the meter tube is opened to the atmosphere.

20. An aquarium filter as in claim 16, wherein the lower end of said meter tube is closed and wherein said connection couples to said meter tube between said upper and lower ends.

21. An aquarium filter as in claim 16, wherein said coupling tube means couples to said meter tube at a lower end thereof.

* * * * *